Figure 1:
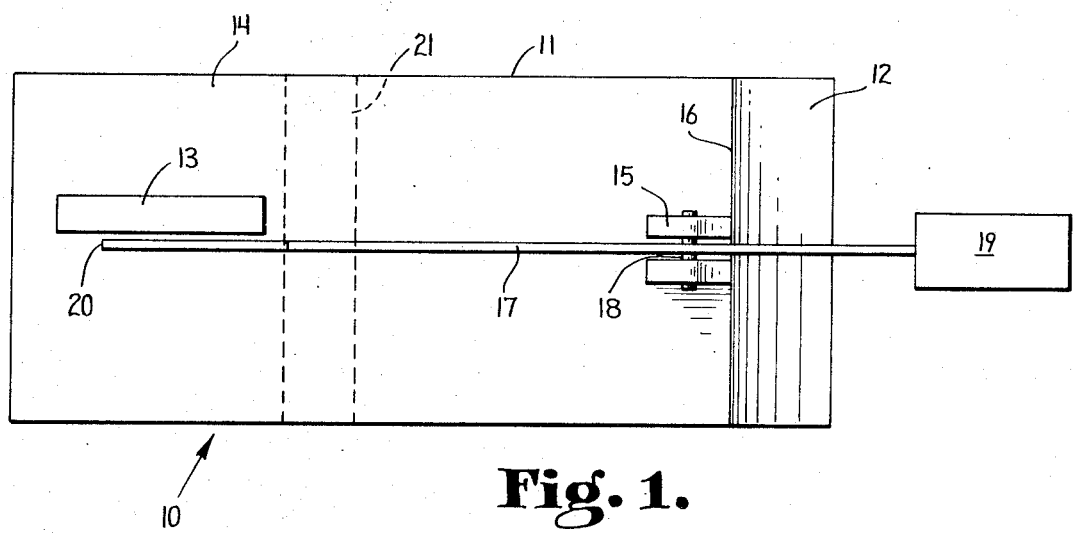

United States Patent

[11] 3,628,496

| [72] | Inventor | Frank J. Schmitt<br>R. R. #3, Eagle River, Wis. 54521 |
|---|---|---|
| [21] | Appl. No. | 823,333 |
| [22] | Filed | May 9, 1969 |
| [45] | Patented | Dec. 21, 1971 |

[54] HEIGHT GAUGE
1 Claim, 2 Drawing Figs.

[52] U.S. Cl. ................................................ 116/124,
33/185, 143/168, 177/246
[51] Int. Cl. ................................................ G09f 9/00
[50] Field of Search ........................................... 116/114,
124, 124.11; 33/172, 172 B, 169, 169 A, 202, 185;
177/245, 246; 143/132, 168, 174, 170

[56] References Cited
UNITED STATES PATENTS

| 447,322 | 3/1891 | Harman | 33/202 |
|---|---|---|---|
| 508,213 | 11/1893 | Fortin | 33/172 |
| 1,186,911 | 6/1916 | Kinney | 33/172 |
| 1,230,166 | 6/1917 | Hunger | 33/202 |
| 2,337,697 | 12/1943 | Varney | 33/172 |
| 3,345,753 | 10/1967 | Giardino | 33/172 |
| 3,382,941 | 5/1968 | Novak | 177/245 X |
| 1,485,429 | 3/1924 | Powell | 116/124 UX |
| 2,696,854 | 12/1954 | Woodruff | 143/168 X |
| 2,815,775 | 12/1957 | Holt | 143/132 X |
| 2,895,513 | 7/1959 | Cowley | 143/170 X |
| 3,205,586 | 9/1965 | Mullen | 143/168 X |

FOREIGN PATENTS

| 1,230,668 | 12/1966 | Germany | 352/172 |
|---|---|---|---|
| 711,244 | 6/1931 | France | 33/172 |

Primary Examiner—Louis J. Capozi
Attorney—Woodard, Weikart, Emhardt & Naughton

ABSTRACT: A height gauge for circular saws or any attachment that fits on the saw arbor. An indicator arm pivotally attached to a pair of spaced mounting brackets. The first end of said indicator arm comprises a contact member which is adapted to contact circular objects. A second end forming a needle pointer which is positioned adjacent to a graduated scale. Components all attached to a suitable base.

PATENTED DEC 21 1971 3,628,496

INVENTOR.
FRANK J. SCHMITT
BY
Woodard, Weikart, Emhardt & Naughton
Attorneys

HEIGHT GAUGE

The present invention relates to a gauge for measuring the height of a circular saw or attachment above the worktable.

The use of gauges to measure the height of various objects is well known in the art. However, a particular problem is encountered when the object to be measured is circular, such as a circular saw mounted in a workbench, as it is necessary to periodically adjust the height of the saw above the surface of the bench. At the present time, the user of the saw must align a conventional ruler or the like to adjust the saw to the desired height. While height gauges are well known in the art, none of the prior art provides an entirely satisfactory means for measuring the height of circular objects such as a circular saw above the worktable.

Therefore, it is a primary object of the present invention to provide a simple, economical and accurate gauge for measuring the height of various objects.

It is an object of the present invention to provide a height gauge adapted to measure the height of a circular saw or attachment above the worktable.

It is a further object of the present invention to provide a height gauge for measuring the height of a circular saw regardless of its diameter.

It is an object of the present invention to provide a height gauge for circular saws and the like, wherein the gauge operates automatically once it is in position, and both of the operator's hands are free to adjust the height and position of the saw.

One embodiment of the present invention might include a base adapted to be positioned on a table adjacent to a circular saw blade, a graduated scale mounted at a first end of the base and first class lever arm pivotally mounted at a second end of the base. The arm has a free end which terminates in an integrally formed needle point and is aligned with the graduated scale and a free end extending beyond an end of the base, said free end carrying a contact member for contacting the periphery of the saw blade. The height gauge is positioned so that the contact member rests on the saw, and the height is read from the indicator gauge.

The full nature of the invention will be understood from the accompanying drawings and the following description and claims.

Figure 2:
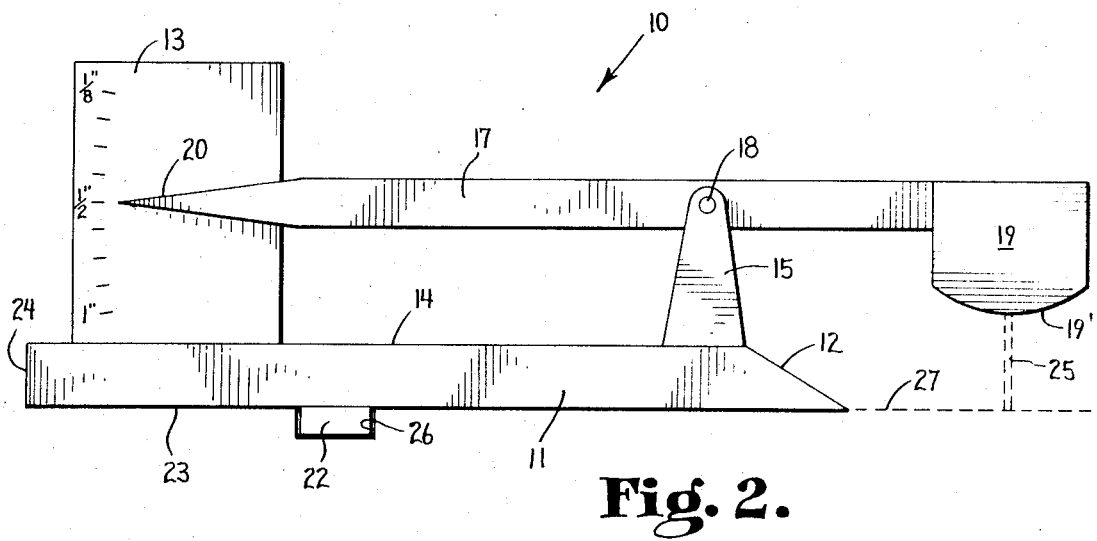

FIG. 1 is a top plan view of the height gauge.
FIG. 2 is a side elevation of the height gauge.

Referring more particularly to the drawings, the height gauge, generally referred to as reference numeral 10, comprises a generally rectangular base 11 having a beveled edge 12 at a first end. A graduated scale 13 is mounted to the top surface 14 of the base and is perpendicular to the top surface. A pair of spaced brackets 15 are mounted to the top surface of the base at the edge 16 of the sloped end 12. An indicator arm 17 pivots about a post 18 which is journaled through the arm and staked to brackets 15. The arm 17 is centrally located between the brackets and extends along the central vertical axis of the base. The arm 17 terminates at a first end in a contact member 19. It can be seen in the drawing that the first end of the arm extends beyond the base. A second end 20 of the arm terminates adjacent the graduated scale and is parallel thereto. A means is provided for mounting base 11 to a work surface not shown in key 22. Dotted lines 21 indicate the position a key 22 which is coupled to the bottom surface 23 of the base and rides in the crosscut guide slot 26 in the table surface 27 to align the height gauge with the saw.

In FIG. 2, it can be seen that the arm 17 is spaced from the top surface 14 of the base 11 at its pivot point. The arm is balanced so that the second end 20, which is formed as a needle pointer, rests at the top of the scale 13 in its normal position. When contact member 19 is positioned on the saw blade, the needle pointer is displaced from its normal position as the arm pivots about post 18. The contact member 19 has an outwardly curved contact surface 19' to insure accuracy.

The present invention provides a simple, economical, accurate and efficient height gauge particularly suited to measure the height of circular objects such as circular saws, although not limited thereto.

The invention claimed is:

1. A height gauge adapted to be positioned in the keyway of a saw table to indicate the depth of the cut a saw blade will make comprising: a base member, a fulcrum means mounted at a first end of said base member, a vertically extending scale member having graduations on a vertical surface thereof mounted at a second end of said base member and aligned with said fulcrum means, a first class lever arm pivotally mounted on said fulcrum means, said arm having one free end terminating in an integral pointer registering with the graduations of said scale member and the other free end of said arm extending outwardly beyond said base member and terminating in an enlarged depending contact member, a contact surface formed on the contact member for contacting the periphery of a saw blade to thereby register at said dial the extent of saw cut, key means mounted on the bottom of said base member for readily, removably positioning the base member in a keyway of a saw table.

* * * * *